United States Patent Office 2,721,207
Patented Oct. 18, 1955

2,721,207
PROCESS FOR THE PRODUCTION OF AMINO DIOLS AND INTERMEDIATE PRODUCTS UTILIZED IN SAID PROCESS

Louis L. Bambas, Grosse Pointe Woods, Mich., assignor to Parke, Davis & Company, Detroit, Mich., a corporation of Michigan No Drawing. Application November 1, 1952,
Serial No. 318,311

14 Claims. (Cl. 260—470)

This application is a continuation-in-part of my copending application Serial No. 306,055, filed August 23, 1952, and the invention relates to a new process for obtaining certain organic amino diols and to the intermediate products utilized in said new process. More particularly, the invention relates to a process for obtaining amino diols having the formula,

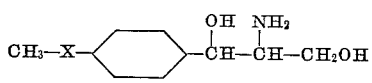

and to certain carboalkoxy intermediate compounds of formula,

produced as intermediates in the process; where X is an —S—, —SO— or —SO$_2$— group, Y is a

or —CHOH— group, R is a carboalkoxy radical and R$_1$ is hydrogen or a —CH$_2$OH group.

It will be apparent to those skilled in the art that the amino diol compounds and the carboalkoxy intermediate compounds wherein Y is a —CHOH— group can exist in diastereoisomeric and optical isomeric forms. Where it is desired to designate the isomers in their separate forms, the terms L-threo, D-threo, L-erythro and D-erythro will be used herein. Similarly, the terms DL-threo and DL-erythro are used herein to designate the unresolved threo and erythro optical racemates respectively. It should be expressly understood that where no special terms of the above type appear with a structural formula or a chemical name, such formula or chemical name is to be interpreted in its generic sense, that is, as representing any one of the separate forms or mixtures thereof and not merely as representing the total unresolved mixture of the isomers.

In accordance with the invention amino diols having the first formula given above are produced from α-aminoacetophenone compounds of formula,

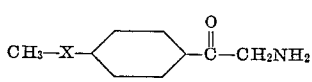

where X has the same significance as given above, or a mineral acid salt thereof, by reacting the α-aminoacetophenone compound with a carboalkoxy halide to produce the corresponding α-carboalkoxyamidoacetophenone, condensing the α-carboalkoxyamidoacetophenone compound so obtained with formaldehyde in the presence of an alkaline condensation catalyst to produce the corresponding α-carboalkoxyamido-β-hydroxypropiophenone compound, reducing the ketone group in said propiophenone compound thereby producing the corresponding 1-phenyl-2-carboalkoxyamidopropane-1,3-diol compound and removing the N-carboalkoxy group by hydrolysis. The transformations involved in the process can be diagrammatically illustrated as follows:

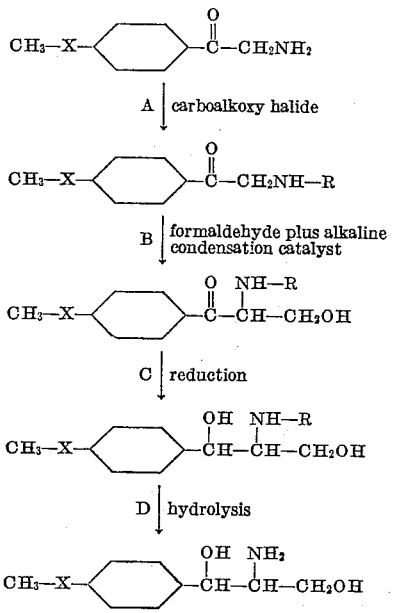

where R and X have the same significance as given above.

In carrying out the reaction between the carboalkoxy halide and the α-aminoacetophenone compound (A in the above diagram), the free base or an acid addition salt of the α-aminoacetophenone compound can be used. Since the free bases are rather unstable it is preferable to employ an acid addition salt of the α-aminoacetophenone compound and generate the free base in situ by carrying out the reaction in the presence of an alkaline substance such as an alkali metal salt of an organic acid, an alkali or alkaline earth metal carbonate, or bicarbonate, an alkali or alkaline earth metal hydroxide, a tertiary organic amine, ammonium hydroxide, calcium hydroxide and the like. Some specific examples of suitable alkaline materials in addition to those already mentioned are sodium acetate, sodium bicarbonate, potassium bicarbonate, sodium carbonate, calcium carbonate, magnesium carbonate, pyridine, quinoline, triethylamine, sodium hydroxide, potassium hydroxide, and potassium carbonate.

The reaction can be carried out under anhydrous or aqueous conditions. When anhydrous conditions are employed, an inert solvent such as benzene, xylene, ether and the like should be used. The temperature of the reaction is not particularly critical but when aqueous conditions are employed it is preferable to keep the temperature below about 50° C. to minimize the decomposition of the carboalkoxy halide reactant.

In carrying out the condensation of the α-carboalkoxyamidoacetophenone compound with formaldehyde in the presence of an alkaline condensation catalyst (B in the above diagram), the formaldehyde may be supplied to the reaction mixture in a number of different forms. For example, formaldehyde gas, aqueous or alcoholic solutions of formaldehyde, paraformaldehyde and other formaldehyde yielding polymers may be used. In most cases it has been found preferable to use an excess of formaldehyde usually up to about 10% in order to insure completeness of the condensation reaction.

A variety of solvents, alkaline condensation catalysts and reaction conditions may also be employed. As solvents, either aqueous or anhydrous lower aliphatic alcohols are particularly advantageous but moist dialkyl ethers and dioxane-water mixtures may also be used. The alkaline condensation catalyst used in this phase of the invention may be organic bases, inorganic bases or inorganic salts of acidic or pseudo acidic organic compounds. Some representative types of these catalysts are the hydroxides, oxides, carbonates, bicarbonates and amides of alkali or alkaline earth metals; alkali metal alkoxides; alkaline earth alkoxides; alkali metal phenolates; alkali metal salts of lower aliphatic carboxylic acids; organic tertiary amines and quaternary ammonium hydroxides of organic tertiary amines. In general, the weakly alkaline catalysts such as sodium bicarbonate, potassium bicarbonate, calcium hydroxide, pyridine, triethylamine, N-ethylmorpholine, N,N-dimethylaniline and the like are preferred since they make the reaction much easier to control. When strongly alkaline catalysts such as sodium hydroxide, potassium hydroxide, potassium carbonate, sodium methylate, sodium ethylate and the like are used, care must be taken to remove or inactivate the catalyst as soon as the reaction is completed in order to prevent the conversion of the desired product to the corresponding methylene bis compound by dehydration and coupling reaction. Although the amount of catalyst is not critical and can vary from a few hundredths or thousandths of a mol to one mol or more, it is preferable from the standpoint of yields to use only enough to bring about a relatively rapid reaction. In most cases 0.05 mol or less is sufficient.

The temperature used in carrying out this methylolation reaction as well as the time required for its completion varies with the catalyst used. In general, the reaction can be carried out at a temperature between about 0 and 75° C. in a time varying from a few minutes to several hours. When strongly alkaline catalysts are used the reaction proceeds very rapidly and is usually complete in a few minutes at room temperature or below. However, when mildly alkaline catalysts are employed the reaction is not so rapid and usually requires from fifteen minutes to several hours at room temperature or slightly above, that is, at about 25 to 50° C.

The reduction of the α-carboalkoxyamido-β-hydroxypropiophenone compounds to the corresponding 1-phenyl-2-carboalkoxyamidopropane-1,3-diols (C in the above diagram) can be carried out in several different ways. For example, an oxidizable aluminum alkoxide or nascent hydrogen generated in the reaction mixture by the interaction of a metal with an acid, lower aliphatic alcohol, water or mixtures of the same can be used.

When using the nascent hydrogen method of reduction, metals or alloys such as sodium, potassium, calcium, sodium amalgam, potassium amalgam, iron and the like are caused to react with the solvent used for the reaction to produce hydrogen in the reaction mixture. Some examples of the solvents which can be used are lower aliphatic alcohols such as methanol, ethanol and isopropanol, lower aliphatic acids such as acetic acid, aqueous mixtures of either lower alpihatic alcohols or acids, moist dialkyl ethers such as moist diethyl ether and lower aliphatic alcohol-acid-water mixtures. Specific combinations of these metals and solvents which have been found to be particularly effective in bringing about the reduction of the ketonic compounds are sodium, potassium or calcium and absolute ethanol or methanol, sodium or potassium amalgam in moist ether, ethanol or acetic acid, and iron in dilute ethanol containing acetic acid.

When an oxidizable aluminum alkoxide is used as a reductant for the ketonic compounds of the invention, the reaction is carried out at a temperature between about 20 and 125° C. in a lower aliphatic alcohol which is preferably the one corresponding to the alkoxide. The use of alkoxides of secondary alcohol such as isopropanol and secondary butyl alcohol is preferred since these alkoxides are more readily oxidized and hence milder reaction conditions can be employed. The amount of the oxdizable aluminum alkoxide in relationship to the quantity of the ketonic compound to be reduced can be varied within rather large limits. In most cases it is seldom necessary to employ more than about three equivalents of the alkoxide but, if desired, as little as one equivalent to as much as twenty or thirty equivalents can be used. When using an alkoxide derived from a secondary aliphatic alcohol in a solvent of the alcohol corresponding to the alkoxide the preferred method of bringing about the reaction is to reflux the reaction mixture containing one or slightly more equivalents of the aluminum alkoxide and to distill the oxidized alcohol off (a lower aliphatic ketone) as it is formed in the reaction mixture.

Where a particular disastereoisomeric form of the amino diol compound is desired, it can be obtained by separation of the amino diol into its diastereoisomers or, if desired, the 1-phenyl-2-carboalkoxyamidopropane-1,3-diol can be separated into its diastereoisomers prior to carrying out the hydrolysis step shown as D in the above diagram. The separation of the 1-phenyl-2-carboalkoxyamidopropane-1,3-diols into their diastereoisomers is quite easily accomplished by utilization of the differences in solubility of the erythro and threo forms in organic solvents or water-organic solvent mixtures. Some of the solvents which can be used to effect this fractional crystallization or solubilization are lower aliphatic alcohols, acetone, chloroform, ethyl acetate and the like.

The hydrolysis of the 1-phenyl-2-carboalkoxyamidopropane-1,3-diol compounds to the corresponding 1-phenyl-2-aminopropane-1,3-diols (D in the above diagram) can be effected with either alkaline or acidic hydrolytic agents. As hydrolytic agents, alkali and alkaline earth metal hydroxides, oxides, carbonates, amides, alkoxides and phenolates, mineral acids, quaternary ammonium hydroxides and the like can be used. Dilute mineral acids such as hydrochloric, hydrobromic, hydroiodic, phosphoric and sulfuric acids are the preferred hydrolytic agents because they are more efficient in bringing about complete hydrolysis in a shorter time with less destruction of the final product. When acidic hydrolytic reagents such as the aforementioned mineral acids are employed, the 1-phenyl-2-aminopropane-1,3-diol product is present in the reaction mixture in the form of an acid addition salt and it can either be isolated as such or the salt can be neutralized and the amino diol isolated as the free base.

The 1-phenyl-2-aminopropane-1,3-diol compounds produced by the process of the invention are valuable intermediates for the production of certain 1-phenyl-2-dichloroacetamidopropane-1,3-diols which possess valuable antibiotic-like properties. Some examples of the 1-phenyl-2-dichloroacetamidopropane-1,3-diol compounds which can be produced from the aforementioned amino diols are DL-threo-1-p-methylsulfonylphenyl-2-dichloroacetamidopropane-1,3-diol, D-(+)-threo-1-p-methylsulfonylphenyl-2-dichloroacetamidopropane-1,3 - diol, DL-threo-1-p-methylmercaptophenyl - 2 - dichloroacetamidopropane-1,3-diol and D-(+)-threo-1-p-methylmercaptophenyl - 2 - dichloroacetamidopropane - 1,3 - diol. These compounds can be prepared from the products of this invention by processes described in my parent application Serial No. 306,055. For instance, in Example 1 I have described the preparation of DL-threo-1-p-methylsulfonylphenyl-2-aminopropane-1,3-diol. This compound can be treated with methyl dichloroacetate to obtain the corresponding dichloroacetamido compound having antibiotic properties.

The invention is illustrated by the following examples.

*Example 1*

280 g. of α-bromo-p-methylsulfonylacetophenone and 140 g. hexamethylenetetramine are suspended in 2 liters of ethylene dichloride. The mixture is allowed to stand for two hours and the light yellow solid is filtered off. The formula of this compound is,

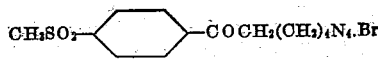

The hexamethylene tetramine complex of α-bromo-p-methylsulfonylacetophenone produced above is suspended in 2 liters of absolute ethanol containing 500 ml. of concentrated hydrochloric acid. The reaction mixture is stirred at room temperature for four hours and then placed in a refrigerator (approx. 3° C.) overnight. The white precipitate of α-amino-p-methylsulfonylacetophenone hydrochloride is filtered off. Its formula is,

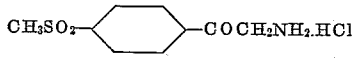

The α-amino-p-methylsulfonylacetophenone produced above is dissolved in 2 liters of ice water containing ice and 150 ml. ethyl chlorocarbonate is added. The reaction mixture is stirred and sufficient sodium acetate and alkali added to keep the solution neutral to litmus. A white waxy precipitate forms. The reaction mixture is allowed to warm to room temperature and the precipitate of α-carbethoxyamido-p-methylsulfonylacetophenone filtered off and recrystallized from ethanol; M. P. 149–150° C. The formula of this compound is,

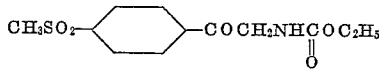

115 g. of α-carbethoxyamido-p-methylsulfonylacetophenone is suspended in a solution consisting of 500 cc. of methanol, 0.5 g. of sodium carbonate, 100 cc. of water and 34 cc. of 36–38% aqueous formaldehyde solution. The reaction mixture is heated at 50° C. for one hour, cooled and filtered. The crystalline [dl]-α-carbethoxyamido-β-hydroxy - p - methylsulfonylpropiophenone so obtained is purified by recrystallization from ethylacetate; M. P. 115–6° C. The formula of this product is,

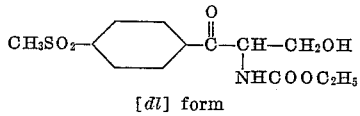

[dl] form 67 g. of [dl]-α-carbethoxyamido-β-hydroxy-p-methylsulfonylpropiophenone is suspended in a solution consisting of 100 g. of aluminum isopropylate in 2 liters of dry isopropanol. The reaction mixture is heated at 70–80° C. with stirring for three hours during which time a small amount of the reaction mixture is distilled off. The reaction mixture is diluted with 500 cc. of water and the alumina is removed by filtration. The filtrate is evaporated to dryness and the residual water-soluble glass is recrystallized from n-butanol. The product thus obtained is DL-threo-1-p-methylsulfonylphenyl-2-carbethoxyamidopropane-1,3-diol which has the formula,

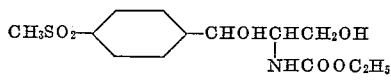

DL-threo form 20 g. of DL-threo-1-p-methylsulfonylphenyl-2-carbethoxyamido-1,3-propanediol is dissolved in 100 ml. ethanol. 5 g. of potassium hydroxide in 10 ml. of water is added. The reaction mixture is allowed to stand at room temperature for two days, neutralized and evaporated in vacuo to dryness. The residue is recrystallized from ethylene dichloride in which it is poorly soluble to obtain the desired DL-threo-1-p-methylsulfonylphenyl-2-aminopropane-1,3-diol; M. P. 134–6° C. The formula of this product is,

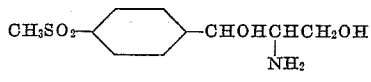

DL-threo form

*Example 2*

260 g. of α-amino-p-methylmercaptoacetophenone hydrochloride is dissolved in 2 liters of ice water containing ice and 150 ml. ethyl chlorocarbonate is added. The reaction mixture is stirred and a quantity of sodium acetate and alkali sufficient to keep the solution neutral to litmus, is added. A white waxy precipitate forms. The temperature of the reaction mixture is allowed to rise to about 25° C. and the precipitate α-carbethoxyamido-p-methylmercaptoacetophenone is filtered off and recrystallized from ethanol. The formula of this compound is,

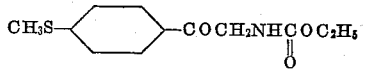

100 g. of α-carbethoxyamido-p-methylmercaptoacetophenone is suspended in a solution consisting of 500 cc. of methanol, 0.5 g. of sodium carbonate, 100 cc. of water and 34 cc. of 36–38% aqueous formaldehyde solution. The reaction mixture is heated at 50° C. for one hour, cooled and filtered. The crystalline dl-α-carbethoxyamido-β-hydroxy-p-methylmercaptopropiophenone so obtained is purified by recrystallization from ethyl acetate. The formula of this product is,

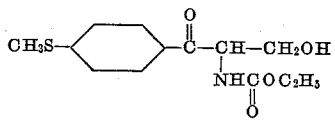

dl-form 60 g. of dl-α-carbethoxyamido-β-hydroxy-p-methylmercaptopropiophenone is suspended in a solution consisting of 100 g. of aluminum isopropylate in 2 liters of dry isopropanol. The reaction mixture is heated at 78–80° C. with stirring for three hours during which time a small amount of the reaction mixture is distilled off. The reaction mixture is diluted with 500 cc. of water and alumina formed as a precipitate is removed by filtration and discarded. The filtrate is evaporated to dryness and the residual water-soluble glass is recrystallized from n-butanol. The product, DL-threo-1-p-methylmercaptophenyl-2-carbethoxyamidopropane-1,3-diol, has the formula,

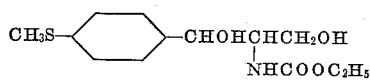

DL-threo form 1.5 g. of DL-threo-1-p-methylmercaptophenyl-2-carbothoxyamidopropane-1,3-diol is suspended in 15 ml. of 1.0 N hydrochloric acid and heated for two hours on a steam bath. The solution is then cooled, diluted with ice water to 60 ml., and allowed to stand on an ice bath for one-half hour. The precipitate which forms on standing is filtered off, washed with ice water and recrystallized from hot water. The product, DL-threo-1-p-methylmercaptophenyl-2-aminopropane-1,3-diol has the formula,

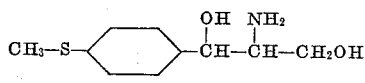

DL-threo form

The α-aminoacetophenone compounds used as starting materials in the practice of the present invention can be prepared from the corresponding acetophenone compound by halogenation to produce the corresponding α-haloacetophenone compound reacting the α-haloacetophenone compound with hexamethylenetetramine to form an α-haloacetophenone hexamethylenetetramine complex, and hydrolyzing the complex so formed with a mineral acid. The following specific example illustrates the application of this method to the production of α-amino-p-methylsulfonylacetophenone hydrochloride.

315 g. of p-methylsulfonylacetophenone [Burton and Hu, J. Chem. Soc. 601 (1948)] is dissolved in 1½ liters of ethylene dichloride (or acetic acid) and brominated with 83 ml. of bromine. The solvent is taken off and the residue recrystallized from ethanol. The formula of this compound is, M. P. 124–5° C.

240 g. of α-bromo-p-methylsulfonylacetophenone is dissolved in 2½ liters of ethylene dichloride or chlorobenzene. 125 g. of hexamethylenetetramine is suspended in the solution and the reaction is stirred for one and one-half hours. A thick white complex is formed and is filtered off and washed with some of the solvent.

The filter cake is suspended in a solution consisting of 2 liters of denatured absolute alcohol and 450 ml. of concentrated hydrochloric acid. The suspension is stirred for two hours and then allowed to stand overnight in an ice chest. The white precipitate which consists of α-amino-p-methylsulfonylacetophenone hydrochloride and ammonium chloride is filtered off and washed with a small quantity of ice water.

What I claim is:

1. A compound of formula,

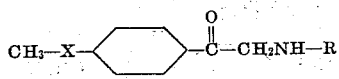

wherein X is —SO$_2$—, and R is a carboalkoxy radical.

2. A compound of formula,

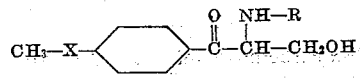

wherein X is —SO$_2$—, and R is a carboalkoxy radical.

3. A threo compound of formula,

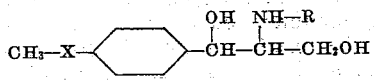

wherein X is —SO$_2$— and R is a carboalkoxy radical.

4. α-carbethoxyamido-p-methylsulfonylacetophenone.

5. α-carbethoxyamido-β-hydroxy-p-methylmercaptopropiophenone.

6. α-carbethoxyamido-β-hydroxy-p-methylsulfonylpropiophenone.

7. DL-threo-1-p-methylsulfonylphenyl-2-carbethoxyamidopropane-1,3-diol.

8. DL-threo-1-p-methylmercaptophenyl-2-carbethoxyamidopropane-1,3-diol.

9. Process for the production of an amido diol of formula,

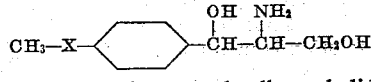

which comprises reacting a carboalkoxy halide with an α-aminoacetophenone compound selected from the class consisting of a free base of formula,

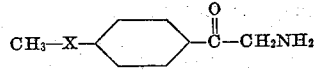

and acid addition salts thereof thereby obtaining an α-carboalkoxyamidoacetophenone compound of formula,

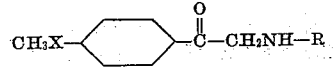

condensing the α-carboalkoxyamidoacetophenone compound so obtained with formaldehyde in the presence of an alkaline condensation catalyst thereby producing the corresponding α-carboalkoxyamido-β-hydroxypropiophenone compound of formula,

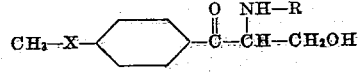

reacting said α-carboalkoxyamido-β-hydroxypropiophenone with a reducing agent to produce a 1-phenyl-2-carboalkoxyamidopropane-1,3-diol compound of formula,

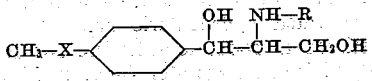

and reacting said 1-phenyl-2-carboalkoxyamidopropane-1,3-diol compound with a hydrolytic agent; where R is a carboalkoxy group and X is a member of the class consisting of —S—, —SO— and —SO$_2$— groups.

10. Process for the production of DL-threo-1-p-methylsulfonylphenyl-2-aminopropane-1,3-diol which comprises reacting ethyl chlorocarbonate with α-amino-p-methylsulfonylacetophenone hydrochloride in the presence of an alkaline catalyst thereby obtaining α-carbethoxyamido-p-methylsulfonylacetophenone, condensing the α-carbethoxyamido-p-methylsulfonylacetophenone so obtained with formaldehyde in the presence of an alkaline condensation catalyst thereby producing α-carbethoxyamido-β-hydroxy-p-methylsulfonylpropiophenone, reacting said propiophenone compound with an oxidizable aluminum alkoxide under anhydrous conditions in a lower aliphatic alcohol thereby obtaining a mixture of DL-threo and DL-erythro-1-p-methylsulfonylphenyl-2-carbethoxyamidopropane-1,3-diol, separating said mixture into its component DL-threo and DL-erythro diastereoisomers and reacting the DL-threo-1-p-methylsulfonylphenyl-2-carbethoxyamidopropane-1,3-diol so obtained with a hydrolytic agent.

11. Process for the production of DL-threo-1-p-methylmercaptophenyl-2-aminopropane-1,3-diol which comprises reacting ethyl chlorocarbonate with α-amino-p-methylmercaptoacetophenone hydrochloride in the presence of an alkaline catalyst thereby obtaining α-carbethoxyamido-p-methylmercaptoacetophenone, condensing the α-carbethoxyamido-p-methylmercaptoacetophenone so obtained with formaldehyde in the presence of an alkaline condensation catalyst thereby producing α-carbethoxyamido-β-hydroxy-p-methylmercaptopropiophenone, reacting said propiophenone compound with an oxidizable aluminum alkoxide under anhydrous conditions in a lower aliphatic alcohol thereby obtaining a mixture of DL-threo and DL-erythro-1-p-methylmercaptophenyl-2-carbethoxyamidopropane-1,3-diol, separating said mixture into its component DL-threo and DL-erythro diastereoisomers and reacting the DL-threo-1-p-methylmercaptophenyl-2-carbethoxyamidopropane-1,3-diol so obtained with a hydrolytic agent.

12. A compound of the formula

wherein X is a member selected from the group consisting of —S—, —SO— and —SO$_2$—, Y is a member selected from the group consisting of —CO— and —CHOH, R is a carboalkoxy radical and R$_1$ is a member selected from the group consisting of hydrogen and hydroxymethyl radicals, R$_1$ always being hydroxymethyl when Y is —CHOH.

13. 1-p-Lower alkyl mercaptophenyl-2-carboalkoxyamidopropane-1,3-diol.

14. 1-p-Lower alkyl sulfonylphenyl-2-carboalkoxyamidopropane-1,3-diol.

References Cited in the file of this patent

UNITED STATES PATENTS

| | | |
|---|---|---|
| 2,341,086 | Dohrn et al. | Feb. 8, 1944 |
| 2,515,239 | Long | July 18, 1950 |